(12) United States Patent
Kaminski et al.

(10) Patent No.: US 9,510,710 B1
(45) Date of Patent: Dec. 6, 2016

(54) FOOD GRINDER WITH AUTOMATIC OFF CONTROLLER AND METHOD

(75) Inventors: Andrzej Kaminski, Warsaw (PL); Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 861 days.

(21) Appl. No.: 13/548,368

(22) Filed: Jul. 13, 2012

Related U.S. Application Data (60) Provisional application No. 61/508,167, filed on Jul. 15, 2011.

(51) Int. Cl.
*A47J 42/44* (2006.01)

(52) U.S. Cl.
CPC .................................... *A47J 42/44* (2013.01)

(58) Field of Classification Search
CPC ....... B24B 49/003; B02C 25/00; A47J 42/44
USPC ......................................... 241/30, 33, 35, 36
See application file for complete search history.

(56) References Cited

U.S. PATENT DOCUMENTS

| | | | |
|---|---|---|---|
| 2,136,907 A * | 11/1938 | Roder | 241/34 |
| 3,545,684 A | 12/1970 | Ruspino | |
| 4,123,009 A | 10/1978 | Kilpinen | |
| 5,287,795 A | 2/1994 | Enomoto | |
| 5,386,944 A | 2/1995 | Knepler et al. | |
| 5,417,145 A | 5/1995 | Joseph, Jr. et al. | |
| 5,511,465 A | 4/1996 | Friedrich et al. | |
| 5,660,336 A | 8/1997 | Joseph, Jr. et al. | |
| 5,718,163 A | 2/1998 | Termini | |
| 6,260,479 B1 | 7/2001 | Friedrich et al. | |
| 6,499,628 B1 * | 12/2002 | Lassota | 222/1 |
| 6,595,445 B2 * | 7/2003 | Fagan et al. | 241/79.1 |
| 6,626,085 B1 * | 9/2003 | Lassota | 99/286 |
| 6,745,964 B2 | 6/2004 | Keller et al. | |
| 6,783,089 B2 * | 8/2004 | Lassota | 241/30 |
| 6,997,408 B2 | 2/2006 | Watano et al. | |
| 7,264,186 B2 * | 9/2007 | Lassota | 241/28 |
| 7,591,438 B2 | 9/2009 | Bohannon, Jr. et al. | |
| 7,980,496 B2 | 7/2011 | Bolognesi et al. | |
| 8,096,229 B2 | 1/2012 | Keller | |
| 8,272,586 B2 | 9/2012 | Bolognesi et al. | |
| 8,292,490 B2 | 10/2012 | Bohannon, Jr. et al. | |
| 8,490,902 B2 | 7/2013 | Keller | |
| 2006/0222736 A1 * | 10/2006 | Keller | 426/45 |
| 2007/0290084 A1 | 12/2007 | Ootsuka | |

(Continued)

*Primary Examiner* — Mark Rosenbaum
(74) *Attorney, Agent, or Firm* — James W. Potthast; Potthast & Associates (57) ABSTRACT

A food grinder (10) makes a sound or vibrates with a frequency that changes between a first mode when the grinding mechanism (22, 24, 36) is performing a grinding operation while there is bulk food ingredient within the grinding chamber, and a second mode when the grinding mechanism (22, 24, 36) is performing a grinding operation while there is no bulk food ingredient within the grinding chamber, has a detector (44) for sensing the change in frequency and a controller (42) responsive to the detector (44) for controlling the application of electrical power to the grinding mechanism (22, 24 36). Power is first applied when a start grind switch is manually actuated and is later automatically removed in response to a timer (54) a preselected time period after the detector senses that the grinding chamber is empty of bulk food ingredient to be ground.

27 Claims, 3 Drawing Sheets

(56) References Cited

U.S. PATENT DOCUMENTS

| | | |
|---|---|---|
| 2008/0202345 A1 | 8/2008 | Delonghi |
| 2009/0095165 A1 | 4/2009 | Nosler et al. |
| 2011/0266379 A1 | 11/2011 | Romanovich et al. |
| 2012/0024160 A1 | 2/2012 | Van Os et al. |
| 2012/0056025 A1 | 3/2012 | Nybo |
| 2012/0111979 A1 | 5/2012 | Jensen et al. |

* cited by examiner

FOOD GRINDER WITH AUTOMATIC OFF CONTROLLER AND METHOD

CROSS-REFERENCE TO RELATED APPLICATION

This application claims the benefit under 35 U.S.C. 119(e) of provisional patent application 61/508,167 of the present inventors, filed Jul. 15, 2011, which is hereby incorporated by reference.

BACKGROUND OF THE INVENTION

Field of the Invention

This invention generally relates to electrical food grinders, such as a coffee bean grinder, and more particularly, to means and methods for controlling the grinding operation of such a grinder.

Discussion of the Prior Art

Electrically powered commercial food grinders are well known in the art as shown by the coffee grinders shown in U.S. Pat. Nos. 6,499,628; 6,595,445; 6,626,085 and 7,264,186, all of which are hereby incorporated by reference. Briefly, such grinders generally comprise a hopper for containing the unground coffee beans, a grind chamber with rotatable grinding burrs, an auger, or screw conveyor for moving coffee beans from the hopper to the grinding chamber, an electrical motor mechanically linked to the grinding burrs to rotate them at high speed to grind the coffee beans within the grinding chamber. The ground coffee beans are automatically dispelled from the grinding chamber and into a suitable container such as a bag or re-sealable can. The control of the motor has in the past been controlled by means of a temporary contact push button electrical grind switch that is manually held in an actuated state to apply electrical power to the motor. The grinding burrs are driven to rotate only so long as the grind switch is held in an actuate state. Alternatively, the period of grinding is determined by means of a switch that is controlled by an electrical timer that applies power to the electrical motor for a preselected time period after initial actuation of a momentary contact grind switch. Different grind switches or positions may be associated with different associated preselected time period, electrical power is automatically removed and grinding stops regardless of whether all the coffee beans within the grinding chamber has been ground and dispensed out of the grinding chamber and into a suitable container, such as a bag.

Coffee grinders are often found in retail food stores that sell whole bean coffee and made available to customers to grind their coffee bean purchase in the store. In such a setting, the customer typically collects a desired amount of coffee beans to be ground in a bag or other container, deposits a the collected beans into the hopper, places the container beneath the outlet of the grinder and actuates the grind push-button switch. The grind switch is maintained in an actuated state until the customer decides that all the coffee beans have been ground or the grinding continues until a preselected time period selected by the customer has elapsed.

A problem arises when not all the coffee beans and residual ground coffee are not fully removed or completely exited from the grinding chamber either because the duration of the grinding time period that is selected is too short to insure that all the coffee and residue is removed or the customer fails to hold the grind actuation switch for a sufficiently long time to insure that the grinding chamber is fully cleared of all residual coffee. Complete removal generally requires the grinding to continue for several seconds after all the bulk coffee has been removed to also remove the fines and other residue that may still be present within the chamber and adhered to the burrs and other interior surfaces of the grinding chamber. Consequently, cross-contamination of different types and flavors of coffee occurs whenever the grinder is not operated a sufficiently long time to either dispel all the coffee fines and other residue after the bulk coffee has been dispelled, or worse, to dispel all the bulk coffee. For instance, vanilla flavored coffee could be mixed with hazelnut flavored coffee or a strong French roast might be mixed with a mild decaffeinated coffee. The cross contamination can be compounded across several successive incomplete grinding cycles resulting in an undesirable mixing of several different types and flavors.

Because of this cross-contamination, in known grinders it often becomes necessary to empty the entire grinder mechanism including the burrs and auger for cleaning between grinding cycles in which different types of coffee or other ingredient is being prepared.

SUMMARY OF THE INVENTION

Accordingly, it is the general object of the present invention to provide an electrically powered food grinder and a method of grinding that are capable of automatically ensuring that all food ingredient is fully ground and the grinding mechanism is cleaned of fines and other residue during each grinding cycle regardless of the amount of ingredient being ground.

This object is achieved in part by providing a food grinder with a grinding assembly for grinding a food ingredient having an electrically powered grinding mechanism for grinding food ingredient received within a grinding chamber, said grinding mechanism creating a detectable condition with a characteristic that changes between a first mode when the grinding mechanism is performing a grinding operation while there is hulk food ingredient within the grinding chamber that is being ground, and a second mode when the grinding mechanism is performing a grinding operation while there is no hulk food ingredient within the grinding chamber; a detector for sensing when the characteristic changes between the first mode and the second mode;

an electrical timer responsive to the detector sensing the characteristic changing from the first mode to the second mode to start a preselected time period during which power continues to be applied to the grinding mechanism; and means responsive to the timer for terminating electrical power to the grinding mechanism after the preselected time period has lapsed, said time period being sufficient to remove fines from the grinding chamber after the bulk food ingredient has been removed.

In one embodiment, the detectable condition is a sound having an acoustical characteristic that changes between a first mode when the grinding mechanism is performing a grinding operation while there is bulk food ingredient within the grinding chamber that is being ground, and a second mode when the grinding mechanism is performing a grinding operation while there is no bulk food ingredient within the grinding chamber, and the detector is an acoustical detector for sensing when the acoustic characteristic changes between the first mode and the second mode.

In such case, the acoustic characteristic is the frequency of sound generated during operation of the grinding mechanism, said frequency changing between relatively low average frequencies when the acoustic characteristic is in the first mode and relatively high average frequencies higher than the relatively low frequencies when the acoustic characteristic is in the second mode. The controlling means includes a start grind switch, said electrical power applying means responding to manual actuation of the start grind switch to initiate application of power to the grinding mechanism to start the grinding operation, and the electrical power controlling means is responsive to the detector sensing the characteristic changing from the first mode to the second mode for causing the electrical power applying means to terminate electrical power to the grinding mechanism to stop the grinding operation.

The detectable condition may be the operating condition of one or more of the grinding mechanism including grinding burrs within the chamber or an electrical motor for driving the grinding mechanism.

Alternatively, a distinctive sounds generating means with a detectable acoustical characteristic located outside of the grinding chamber that is actuated only when the grinding operation is being performed. The distinctive sounds generating member generates at least two distinctly different sounds depending upon whether there is, or is not, bulk food ingredient within the chamber being ground during the grinding operation. In the case of a distinctive sounds generating means being used, the detector is an acoustical detector that is located outside the grinding chamber and adjacent the distinctive sounds generating means. The distinctive sound generating means may comprise a thin walled rotatable fin that rotates when the grinding mechanism is performing a grinding operation.

In one embodiment, the food grinder, the food grinding mechanism includes grinding burrs contained within the grinding chamber, an electrical motor located outside of the grinding chamber, a rotary motor axle interconnecting the electrical motor with the grinding burrs to rotate the grinding burrs during the grinding operation, and said sounds generating means includes a least one distinctive tone generating member linked to the rotary motor axle outside of the grinding chamber to rotate with the rotary axle, said tone generating member providing at least part of the acoustic characteristic, said distinctive sound generating means generating a relatively low frequency sound when in the first mode and the electrical motor is rotating relatively slowly, while the grinding operation is being performed and there is bulk ingredient within the grinding chamber that is being ground, and a relatively high frequency sound higher in frequency than the relatively low frequency sound when in the second mode and the electrical motor is rotating relatively faster, while the grinding operation is being performed while but there is no longer bulk food ingredient within the grinding chamber.

In another embodiment of the food grinder, the detectable condition is a mechanical vibrational condition of the grinder with a characteristic that changes between a first vibrational mode when the grinding assembly is performing a grinding operation while there is bulk food ingredient within the grinding chamber that is being ground, and a second vibrational mode when the grinding assembly is performing a grinding operation while there is no bulk food ingredient within the grinding chamber, and the detector is a vibration detector for sensing when the mechanical vibration characteristic changes between the first mode and the second mode.

In this vibration responsive embodiment of the food grinder, the controlling means preferably includes means responsive to manual actuation of a start grind switch to initiate applying of power to the grinding mechanism to start the grinding operation and means responsive to the vibration detector sensing the mechanical vibrational acoustic characteristic changing from the first mode to the second mode for terminating electrical power to the grinding mechanism to stop the grinding operation. The vibration frequency changes between a relatively low frequency when the mechanical vibrational characteristic is in the first mode and a relatively high frequency when the mechanical vibrational characteristic is in the second mode. Preferably, the electrical power terminating means includes an electrical timer responsive to the vibrational characteristic detector for terminating electrical power to the grinding mechanism a preselected time period after the mechanical vibrational characteristic changes from the first mode to the second mode.

The objective of the present invention is also achieved by provision of a method of grinding food in a food grinder having the steps of grinding a food ingredient with a grinding assembly having an electrically powered grinding mechanism for grinding food ingredient received within a grinding chamber, said grinding mechanism creating a detectable condition with a characteristic that changes between a first mode when the grinding mechanism is performing a grinding operation while there is bulk food ingredient within the grinding chamber; sensing with a detector when the characteristic changes between the first mode and the second mode; selectively applying electrical power to the grinding mechanism; responding with an electrical timer to the detector sensing the characteristic changing from the first mode to the second mode to measure a preselected time period, and removing electrical power from the grinding mechanism at the end of said preselected time period, said preselected time period being sufficient to remove fines from the grinding chamber after the chamber has been substantially emptied.

In one embodiment, the detectable condition is a sound having an acoustical characteristic that changes between a first mode when the grinding mechanism is performing a grinding operation while there is bulk food ingredient within the grinding chamber that is being ground, and a second mode when the grinding mechanism is performing a grinding operation while there is no bulk food ingredient within the grinding chamber, and the step of detecting includes sensing when the acoustic characteristic changes between the first mode and the second mode with an acoustical detector. In such case, the acoustic characteristic is the frequency of sound generated during operation of the grinding mechanism, the frequency changing between relatively low average frequencies when the acoustic characteristic is in the first mode and relatively high average frequencies higher than the relatively low frequencies when the acoustic characteristic is in the second mode.

Preferably, the step of controlling includes responding to actuation of a start grind switch to initiate application of power to the grinding mechanism to start the grinding operation, and responding to the detector sensing the characteristic changing from the first mode to the second mode for causing the electrical power applying means to terminate electrical power to the grinding mechanism to stop the grinding operation.

The detectable condition may be the operating condition of the grinding mechanism. Alternatively, the grinding mechanism includes an electrical motor for driving the grinding mechanism, and the step of detecting comprises detecting the operating condition of the electrical motor.

However, preferably the method of detecting includes providing a distinctive sounds generating means with a detectable acoustical characteristic located outside of the grinding chamber that is actuated only when the grinding operation is being performed to generated at least two distinctly different sounds depending upon whether there is, or is not, bulk food ingredient within the chamber being ground during the grinding operation.

If the detectable condition is not a sound, then the detectable condition is a mechanical vibrational condition of the grinder with a characteristic that changes between a first vibrational mode when the grinding assembly is performing a grinding operation while there is bulk food ingredient within the grinding chamber that is being ground, and a second vibrational mode when the grinding assembly is performing a grinding operation while there is no bulk food ingredient within the grinding chamber, and the step of detecting includes the step of detecting the vibration characteristic with a vibration detector for sensing when the mechanical vibration characteristic changes between the first mode and the second mode.

Preferably, the step of controlling includes the steps of responding to manual actuation of a start grind switch to initiate applying of power to the grinding mechanism to start the grinding operation, and responding to the vibration detector sensing the mechanical vibrational acoustic characteristic changing from the first mode to the second mode for terminating electrical power to the grinding mechanism to stop the grinding operation. The step of detecting includes the step of detecting the vibration frequency changing between a relatively low frequency when the mechanical vibrational characteristic is in die first mode and a relatively high frequency when the mechanical vibrational characteristic is in the second mode.

Preferably, the step of terminating electrical power includes the steps of actuating a an electrical timer in response the mechanical vibrational characteristic changing from the first mode to the second mode to measure a preselected time period, terminating electrical power to the grinding mechanism when the preselected, time period has lapsed.

BRIEF DESCRIPTION OF THE DRAWINGS

The foregoing advantageous features and objects of the invention will be disclosed in detail and others will be made apparent from the detailed description of the embodiments of the invention, in which.

DETAILED DESCRIPTION

Figure 1:
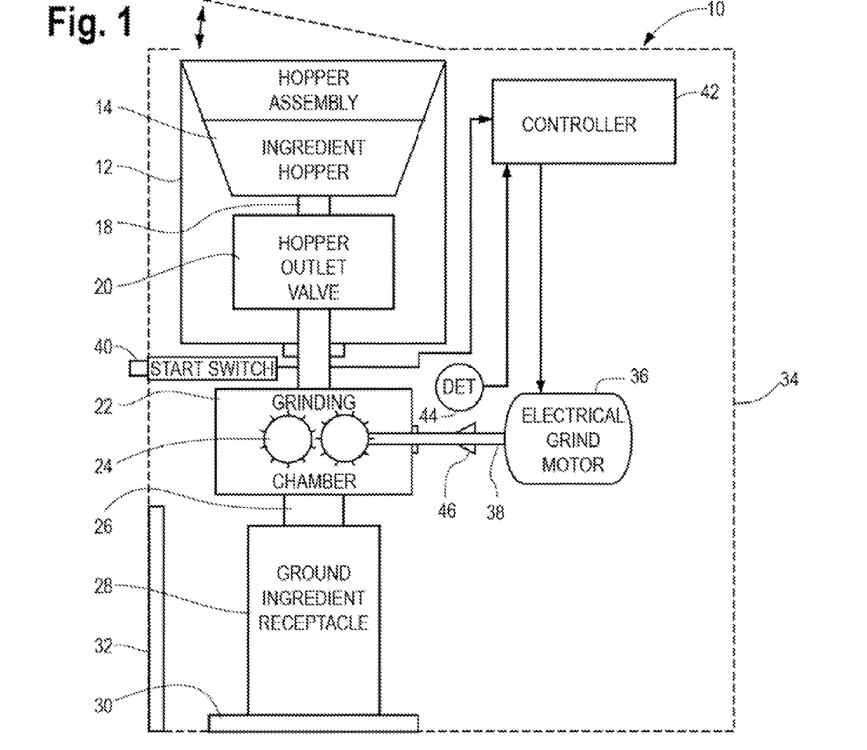
FIG. 1 is a functional block diagram of a preferred embodiment of the automatic off-controlled food grinder of the present invention.

Referring to FIG. 1, the preferred form of the automatic off-controlled food grinder 10 of the present invention has a number of conventional elements including a hopper assembly 12 having an ingredient hopper 14 with an open top closable by a movably mounted cover 16 and an open bottom 18 with a hopper outlet valve 20. The hopper outlet valve 20 automatically closes when the hopper 14 is removed from connection with a grinding chamber 22. The hopper outlet valve 20 is open when mounted within the grinder 10 and feeds ingredient from the hopper 12 into a grinding chamber 22. Contained with the grinding, chamber 22 is a pair of rotatable grinding burrs 24. During operation, the grinding burrs 24 rotate in opposite directions and grind ingredient that falls from the open hopper valve 20 on top a the burrs 24. The ground ingredient then passes between the burrs 24 and falls from a grinding chamber outlet 26 into a ground ingredient receptacle 28.

In a retail food store setting, the ingredient receptacle 28 may be a plastic bag or resealable can while in a commercial coffee making setting the receptacle may be a specially titled brew basket. In the case of the retail food store setting the ground receptacle is contained with a load station 30 located beneath the grinding chamber 22 and behind a protective receptacle door 32 movably mounted to a grinder housing 34. The cover 16, the loading door 32 and the housing are all designed to prevent the grinding material, fines and residue from leaving the interior of the housing 34, and the loading door is also designed to prevent users in a store from gaining access to the interior of the grinder during the grinding operation. In a commercial grinder, a brew basket is snugly and removably mounted beneath and sealed against the bottom of the grinder chamber to prevent ground ingredient or residue from leaving the brew basket during grinding.

As a consequence of the housing 34 being closed during grinding operations, it is not possible for the user to either see that no more ground ingredient is being passed to the receptacle 28.

During the grinding operation, the rotary grinding burrs 24 are powered by an electrical grind motor 36 connected to the grinding burrs 24 by a suitable linkage including a motor axle 38. As a result of the snug closure of the housing 34 during the grinding operation, it may also be difficult for users to hear sounds emanating from the interior of the housing 34.

These features may be seen in detail in one or more of the following United States patents, all of which are hereby incorporated by reference: U.S. Pat. No. 6,595,445 issued Jul. 22, 2003 to Fagan et al. for Coffee Grinder With Chaff Dispersion Reducing Apparatus and Method"; U.S. Pat. No. 6,626,085 issued Sep. 30, 2003 to Lassota for "Food Ingredient Grinder, Removable Ingredient Hopper and Method"; U.S. Pat. No. 6,783,089 issued Aug. 31, 2004 to Lassota for "Food Ingredient Grinder Assembly and Method" and U.S. Pat. No. 7,264,186 issued Sep. 4, 2007 to Lassota for "Food Ingredient Grinder with Tool-less Removable Ingredient Hopper and Method". Preferably, the present grinder is best utilized to grind coffee beans as shown in the above patents but other ingredients could also be ground in accordance with the present invention.

Unlike known grinders, the present grinder 10 does not control the grinding operation entirely with a grind switch that must be manually held in an actuated state or a momentary start switch that starts a grinding cycle of predetermined duration.

Instead, the start of the grind cycle is initiated by momentary manual actuation of a start grind switch 40 but the grinding operation is later terminated automatically based on when the grinding chamber 22 has been emptied of all the beans that have been ground regardless of amount of beans ground or the length of time that was required to grind all beans to be ground. After it has been automatically determined that all the beans have been ground, the grinding operation then continues for a preselected time period of sufficient duration to insure that the interior of the grinding chamber 22 and the grinding burrs 24 have all been cleaned of residual ground coffee, fines, etc. to reduce, if not prevent, significant cross-contamination. The termination of grinding is thus not based on a total preselected time period or a predetermined quantity of beans to be ground because even if the total amount of beans is known, different types of beans, different sized beans. or beans even of the same type and size but with different moisture contents may take significantly different total grinding periods.

Thus, the automatic termination does not occur either automatically at the end of any preselected time period after manual actuation of the start switch 40 or by non-automatic manual means, both of which are unreliable to insure sufficient cleaning after each grind cycle to insure against cross-contamination. In addition, excessive grinding operation and resultant inefficiency and unnecessary wear and tear are prevented by choosing fixed time periods that excessive for some smaller than average loads of coffee being ground during a single grind cycle. Instead, as noted above, means are provided to automatically detect when all ingredient in the grinding chamber 22 has been ground and expelled from the chamber 22. Then the grinding operation is only terminated after a preselected time period has lapsed after it is determined that all bulk ingredient has been expelled which time period need not change for different loads of coffee, since the time for cleaning after all the ground coffee has been expelled does not vary; only the total time of the grinding operation need change for different amounts, types, etc. The continuation of the rotation of the grinding burrs after the bulk ground ingredient has been expelled from the grinding chamber 22 lasts only for a preselected time period sufficiently long to insure that the grinding burrs 24 and interior of the grinding chamber 22 have been substantially cleaned of bulk beverage, such as ground coffee beans, as well as residual ground coffee, fines and other residue resulting from the grinding operation and which may cling to the interior sides of the grinding chamber 22 or to the grinding burrs 24.

The continued rotation of the burrs after grinding is complete creates air turbulence that cleans both the interior of the grinding chamber 22 and the grinding burrs 24. The continued rotation of the burrs 24 also results in imparting rotational momentum to any residue clinging to the burrs 24 to fling the residue off of the burrs. The continued grinding operation during the cleaning portion of the grinding cycle also causes vibrations in the grinding chamber 22 that can not only be sensed but which tends to shed residual material from off the interior sides of the grinding chamber.

When the start grind switch 40 is temporarily actuated a signal is passed to a controller 42. The controller 42 responds to the start signal to apply electrical power to the electrical grind motor 36 to commence the grinding period during which the ingredient is passed into the grinding chamber 22, ground by the rotating burrs 24 and dispelled into the ground ingredient receptacle 28. The termination of power to the electrical motor 36 does not occur until two events occur. First, a detector 44, which is an acoustical detector, such as microphone, or a vibrational detector, such as a piezoelectric vibration sensor or a cantilever-type vibration sensor must indicate that the grinding chamber 22 has been emptied of beans and thus the grinding burrs are no longer grinding whole coffee beans.

The mini-sense vibration sensors made by Measurements Specialties company, including the Mini-sense Vibration Sensor 100, as shown in the specification sheet of Nov. 3, 2008, attached as Exhibit A to the aforementioned provisional patent application and hereby incorporated by reference, are believed suitable for sensing a change in the frequency of vibrations within the housing 34 associated with cessation of ingredient being ground. Piezoelectric vibrations sensors described in the technical specifications of SKF Reliability Systems of San Diego, Calif., attached as Exhibit B to the aforementioned provisional patent application and hereby incorporated by reference, are also believed to suitable for use in the present invention. Reference may also be made to the Sensor Guide of The Cole-Palmer Technical Library, Sensor Selection, etc., attached as Exhibit C to the aforementioned provisional patent application and hereby incorporated by reference, which is also available at www.colepalmer.com, for the details of such vibrations sensors and their optimum use.

The controller 42 responds to an increase in pitch, or frequency, of the sounds generated by operation of the grinding burrs when the grinding chamber has been exhausted of bulk ingredient to be ground when if a microphone is employed as the detector 44. If a vibrational detector is employed as the detector 44, then the controller 42 responds to an increase of the frequency of the mechanical vibrations that occurs when the grinding chamber has been exhausted of bulk ingredient to be ground.

In the case of the detector 44 being a microphone, it may be located near the outside of the grinding chamber and the electrical grind motor 36. Alternatively, the drive axle 38 of the motor 36 may be provided with one or more noise making vanes 46 or other device that will generate a distinctive change in frequency of the sound generate when the drive axle 38 speed up after all ingredient has been expelled from the grinding chamber and there is no longer a load working against the electrical motor 36. In such case, the microphone may be placed near the noise making vanes 46.

Figure 2:
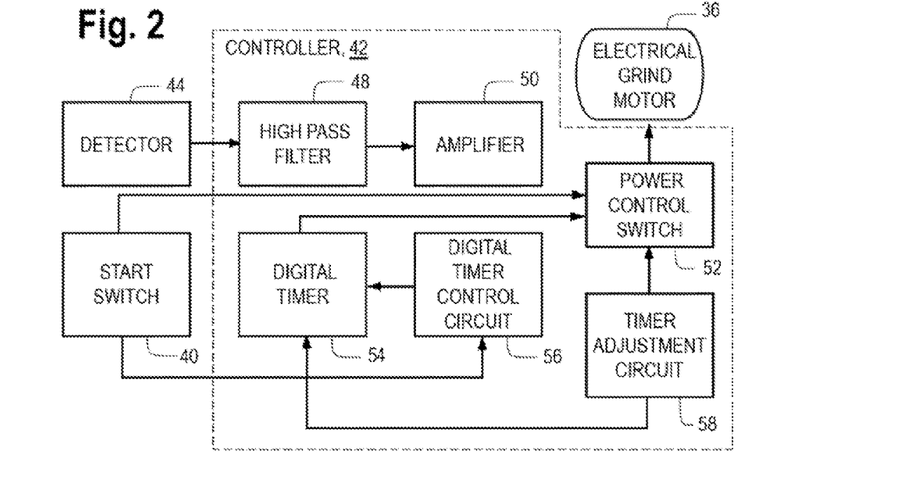
FIG. 2 is a functional block diagram of the controller shown as a single block in FIG. 1.

Referring to FIG. 2, the inventors have determined that the sound frequency or the vibrational frequency increases once the grinding chamber is exhausted of the bulk ingredient being ground. Accordingly, the controller has a high pass filter 48 to pass only this distinctive higher frequency detection signal to an amplifier 50. When the start switch 40 is actuated a signal is passed to a power control switch 52 which turns on, or closes, to provide electrical power to the electrical motor 36 to start the grinding cycle. The power control switch remains in this closed state until turn off by an off signal from a digital timer 54. When a high frequency signal is received by a digital timer control circuit 56, it generates a start timer signal that is passed to the digital tinier 54. The digital timer then starts timing and when a preselected time period has passed, it generates an off signal to the power control switch 52. Until then, an on signal is generated by the timer 54 keep the power control switch 52 closed and the grinding operation continuing. The time period of the digital timer 54 is variable with the changes in the time period being made by means of a timer adjustment circuit 58. The time period may be varied from 5-30 seconds with longer periods being selected for very fine grinds such as when espresso coffee beans are being ground.

Figure 3:
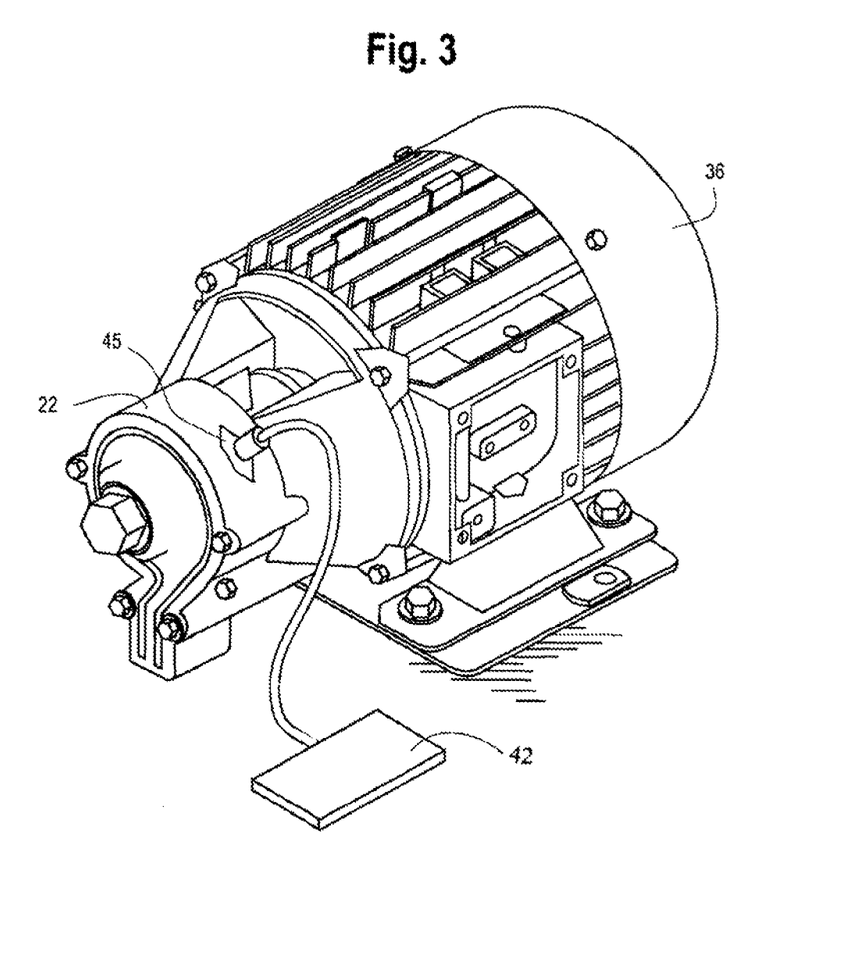
FIG. 3 is a perspective view of an embodiment of a grinding chamber with an attached accelerometer or vibration sensor attached to the grind chamber that may be used in lieu of the acoustical detector 44 of FIG. 1.

As shown in FIG. 3, in the case of the detector 44 of FIG. 2 being a vibrational sensor or accelerometer 45, the detector 45 is attached directly to the outer wall of the grind chamber 22 by an intermediate vibration transmitting member. The detector 45 detects changes in vibration of the chamber 22 that occur between when the chamber 22 has beans being ground and when the chamber 22 is empty. The signal from the detector 45 is passed to the controller 42. The detector 45 may be implemented with a vibration sensor module which provides calibrated averaging (root mean squared) vibration measurement with analog voltage or digital serial output signals being generated that represent the vibrational level, such as the SQ-SVS Solid State Vibration Sensor made by SignalQuest, as shown in the data sheet attached as Exhibit D to the aforementioned provisional patent application and hereby incorporated by reference.

Figure 4:
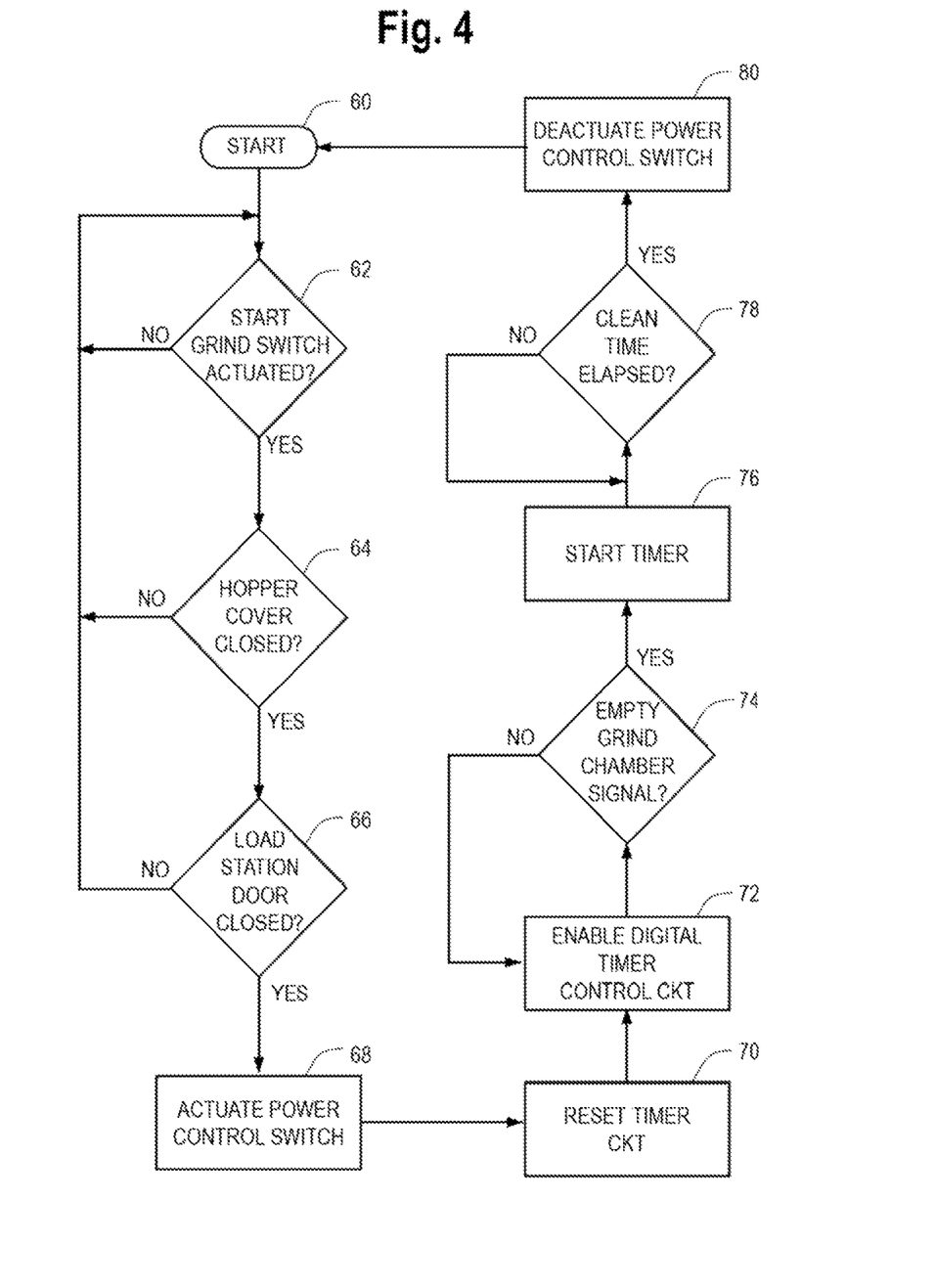
FIG. 4 is a logic flow chart of the preferred grinder control method used with the automatic off-controlled food grinder of FIGS. 1-3.

Referring now to FIG. 4, the automatic off-control preferably functions in accordance with the logic flow chart shown. After start, a determination is made by the controller 42 in step 62 as to whether the start switch 40 has been actuated. If so, then in step 64 a determination is made as to whether the hopper cover 16 is closed, via a sensor switch (not shown). If the cover 16 is closed, then in step 66 a determination is made whether the load station door 32 is closed. If the door 32 is closed, then the power control switch 52 is actuated in step 68 and the tinier circuit is reset to zero time is step 70. Then in step 72, the digital timer control circuit 56 is enabled. In step 74, a determination is made as to whether the high frequency empty grind chamber signal has been received by the digital timer control circuit. If the high frequency signal has been received then in step 76 the timer is started. After the clean time period established by the timer 54 has lapsed as determined in step 78, the power control switch 52 is deactuated to remove power from the electrical grind motor.

While a particular embodiment has been disclosed in detail, it should be appreciated that many variations may be made that will occur to persons of ordinary skill in the art without departing from the spirit of the invention.

The invention claimed is:

1. A food grinder, comprising:
a grinding mechanism having a grinding chamber with a plurality of electrically powered grinding members for grinding food ingredient received within the grinding chamber;
an electrical grind motor located freely outside of the grinding chamber, said grind motor having no housing shared with only the grinding chamber to drive the grinding members within the grinding chamber, said electrical grind motor creating outside of the grinding chamber a detectable condition detectable outside of the grinding chamber with a characteristic that changes between
a first mode when the grinding mechanism is performing a grinding operation while there is bulk food ingredient within the grinding chamber that is being ground, and
a second mode when the grinding mechanism is performing a grinding operation while there is no bulk food ingredient within the grinding chamber;
a detector for sensing when the characteristic changes between the first mode and the second mode;
means for selectively applying electrical power to the grinding mechanism; and
means responsive to the detector sensing the characteristic changing for controlling the electrical power applying means including an electrical timer responsive to the detector sensing the characteristic changing from the first mode to the second mode to start a preselected time period during which power continues to be applied to the grinding mechanism; and
means responsive to the timer for terminating electrical power to the grinding mechanism after the preselected time period has lapsed, said time period being sufficient to remove fines from the grinding chamber after the bulk food ingredient has been removed.

2. The food grinder of claim 1 in which
the detectable condition is a sound having an acoustical characteristic that changes between
the first mode when the grinding mechanism is performing a grinding operation while there is bulk food ingredient within the grinding chamber that is being ground, and
the second mode when the grinding mechanism is performing a grinding operation while there is no bulk food ingredient within the grinding chamber, and
the detector is an acoustical detector for sensing when the acoustical characteristic of the grind motor changes between the first mode and the second mode.

3. The food grinder of claim 2 in which
the acoustical characteristic is the frequency of sound generated during operation of the grinding mechanism, said frequency changing between relatively low average frequencies when the acoustical characteristic is in the first mode and relatively high average frequencies higher than the relatively low frequencies when the acoustical characteristic is in the second mode.

4. The food grinder of claim 1 in which the controlling means includes
a start grind switch, said electrical power applying means responding to manual actuation of the start grind switch to initiate application of power to the grinding mechanism to start the grinding operation, and in which
the electrical power controlling means is responsive to the detector sensing the characteristic of the electrical grind motor changing from the first mode to the second mode for causing the electrical power applying means to commence a measured time period for continuation of the grinding mechanism to stop the grinding operation.

5. A food grinder, comprising:
a grinding mechanism having a grinding chamber with a plurality of electrically powered grinding members for grinding food ingredient received within a grinding chamber;
an electrical grind motor located freely outside of the grinding chamber, said grind motor having no housing shared with only the grinding chamber to drive the grinding members within the grinding chamber, said electrical grind motor creating outside of the grinding chamber a detectable condition detectable outside of the grinding chamber with a characteristic that changes between
a first mode when the grinding mechanism is performing a grinding operation while there is bulk food ingredient within the grinding chamber that is being ground, and
a second mode when the grinding mechanism is performing a grinding operation while there is no bulk food ingredient within the grinding chamber;
a detector for sensing when the characteristic changes between the first mode and the second mode;
means for selectively applying electrical power to the grinding mechanism; and
means responsive to the detector sensing the characteristic changing for controlling the electrical power applying means including an electrical timer responsive to the detector sensing the characteristic changing from the first mode to the second mode to start a preselected time period during which power continues to be applied to the grinding mechanism; and means responsive to the timer for terminating electrical power to the grinding mechanism after the preselected time period has lapsed, said time period being sufficient to remove fines from the grinding chamber after the bulk food ingredient has been removed, and in which the electrical grind motor has a distinctive sounds generating means located outside of the grinding chamber for generating independently of the grinding chamber sounds corresponding to the detectable condition with a detectable acoustical characteristic also located outside of the grinding chamber that is actuated only when the grinding operation is being performed, said distinctive sounds generating means generating at least two distinctly different sounds depending upon whether there is, or is not, bulk food ingredient within the chamber being ground during the grinding operation, said two distinctive sounds being sounds other than sounds created within the grinding chamber or by the grind motor or any housing of either or both the grinding chamber and the grind motor.

6. The food grinder of claim 5 in which the detector is an acoustical detector that is located outside the grinding chamber and adjacent the distinctive sounds generating means also located outside of the grind chamber.

7. A food grinder, comprising:
a grinding assembly for grinding a food ingredient having an electrically powered grinding mechanism for grinding food ingredient received within a grinding chamber, said grinding mechanism creating a detectable condition with a characteristic that changes between
　　a first mode when the grinding mechanism is performing a grinding operation while there is bulk food ingredient within the grinding chamber that is being ground, and
　　a second mode when the grinding mechanism is performing a grinding operation while there is no bulk food ingredient within the grinding chamber;
a detector for sensing when the characteristic changes between the first mode and the second mode;
means for selectively applying electrical power to the grinding mechanism; and
means responsive to the detector sensing the characteristic changing for controlling the electrical power applying means including an electrical timer responsive to the detector sensing the characteristic changing from the first mode to the second mode to start a preselected time period during which power continues to be applied to the grinding mechanism;
means responsive to the timer for terminating electrical power to the grinding mechanism after the preselected time period has lapsed, said time period being sufficient to remove fines from the grinding chamber after the bulk food ingredient has been removed; and in which
the grinder includes a distinctive sounds generating means with a detectable acoustical characteristic located outside of the grinding chamber that is actuated only when the grinding operation is being performed,
said distinctive sounds generating member generating at least two distinctly different sounds depending upon whether there is, or is not, bulk food ingredient within the chamber being ground during the grinding operation, the distinctive sound generating means including a thin walled rotatable fin that rotates when the grinding mechanism is performing a grinding operation.

8. A food grinder, comprising:
a grinding assembly for grinding a food ingredient having an electrically powered grinding mechanism for grinding food ingredient received within a grinding chamber, said grinding mechanism creating a detectable condition with a characteristic that changes between
　　a first mode when the grinding mechanism is performing a grinding operation while there is bulk food ingredient within the grinding chamber that is being ground, and
　　a second mode when the grinding mechanism is performing a grinding operation while there is no bulk food ingredient within the grinding chamber;
a detector for sensing when the characteristic changes between the first mode and the second mode;
means for selectively applying electrical power to the grinding mechanism; and
means responsive to the detector sensing the characteristic changing for controlling the electrical power applying means including an electrical timer responsive to the detector sensing the characteristic changing from the first mode to the second mode to start a preselected time period during which power continues to be applied to the grinding mechanism;
means responsive to the timer for terminating electrical power to the grinding mechanism after the preselected time period has lapsed, said time period being sufficient to remove fines from the grinding chamber after the bulk food ingredient has been removed; and in which
the grinder includes a distinctive sounds generating means with a detectable acoustical characteristic located outside of the grinding chamber that is actuated only when the grinding operation is being performed,
said distinctive sounds generating means generating at least two distinctly different sounds depending upon whether there is, or is not, bulk food ingredient within the chamber being ground during the grinding operation; and in which the grinding mechanism includes
grinding burrs contained within the grinding chamber,
an electrical motor located outside of the grinding chamber,
a rotary motor axle interconnecting the electrical motor with the grinding burrs to rotate the grinding burrs during the grinding operation, and
said sounds generating means includes a least one distinctive tone generating member linked to the rotary motor axle outside of the grinding chamber to rotate with the rotary axle, said tone generating member providing at least part of the acoustical characteristic, said distinctive sound generating means generating
　　a relatively low frequency sound when in the first mode and the electrical motor is rotating relatively slowly, while the grinding operation is being performed and there is bulk ingredient within the grinding chamber that is being ground, and
　　a relatively high frequency sound higher in frequency than the relatively low frequency sound when in the second mode and the electrical motor is rotating relatively faster, while the grinding operation is being performed but there is no longer bulk food ingredient within the grinding chamber.

9. The food grinder of claim 8 in which the distinctive tone generating member includes a thin walled fin attached to the motor axle.

10. A method of grinding food in a food grinder, comprising:
grinding a food ingredient with a grinding assembly having an electrically powered grinding mechanism within a grinding chamber that is driven by an electrical grind motor located outside of the grinding chamber and having no housing shared with the grinding chamber for grinding food ingredient received within the grinding chamber, said electrical grind motor creating outside of the grinding chamber a detectable condition with a characteristic that changes between
- a first mode when the electrical grind motor is driving the grinding mechanism when performing a grinding operation while there is bulk food ingredient within the grinding chamber that is being ground, and
- a second mode when the electrical grind motor is driving the grinding mechanism when performing a grinding operation while there is no bulk food ingredient within the grinding chamber;

sensing with a detector when the characteristic changes between the first mode and the second mode;
selectively applying electrical power to the grinding mechanism;
responding to the detector for controlling the electrical power applying means including the step of responding with an electrical timer to the detector sensing the characteristic changing from the first mode to the second mode to measure a preselected time period; and
removing electrical power from the grinding mechanism at the end of said preselected time period, said preselected time period being sufficient to remove fines from the grinding chamber after the chamber has been substantially emptied.

11. The food grinding method of claim 10 in which the detectable condition is a sound generated by a source located outside of the grinding chamber and having an acoustical characteristic that changes between
- a first mode when the grinding mechanism is performing a grinding operation while there is bulk food ingredient within the grinding chamber that is being ground, and
- a second mode when the grinding mechanism is performing a grinding operation while there is no bulk food ingredient within the grinding chamber, and
the detector is an acoustical detector for sensing when the acoustical characteristic changes between the first mode and the second mode.

12. The food grinding method of claim 11 in which the acoustical characteristic is the frequency of sound generated during operation of the grinding mechanism, said frequency changing between relatively low average frequencies when the acoustical characteristic is in the first mode and relatively high average frequencies higher than the relatively low frequencies when the acoustical characteristic is in the second mode.

13. The food grinding method of claim 10 in which the step of controlling includes
responding to actuation of a start grind switch to initiate application of power to the grinding mechanism to start the grinding operation, and in which
responding to the detector sensing the characteristic changing from the first mode to the second mode for causing the electrical power applying means to terminate electrical power to the grinding mechanism to stop the grinding operation.

14. The food grinding method of claim 10 in which the detectable condition is the operating condition of the electric grind motor.

15. A method of grinding food in a food grinder, comprising:
grinding a food ingredient with a grinding assembly having an electrically powered grinding mechanism within a grinding chamber that is driven by an electrical grind motor located outside of the grinding chamber for grinding food ingredient received within the grinding chamber, said electrical grind motor creating outside of the grinding chamber a detectable condition with a characteristic that changes between
- a first mode when the electrical grind motor is driving the grinding mechanism when performing a grinding operation while there is bulk food ingredient within the grinding chamber that is being ground, and
- a second mode when the electrical grind motor is driving the grinding mechanism when performing a grinding operation while there is no bulk food ingredient within the grinding chamber;

sensing with a detector when the characteristic changes between the first mode and the second mode;
selectively applying electrical power to the grinding mechanism;
responding to the detector for controlling the electrical power applying means including the step of responding with an electrical timer to the detector sensing the characteristic changing from the first mode to the second mode to measure a preselected time period; and
removing electrical power from the grinding mechanism at the end of said preselected time period, said preselected time period being sufficient to remove fines from the grinding chamber after the chamber has been substantially emptied, and in which
the grinder includes a distinctive sounds generating member located outside of and apart from the grinding chamber to create distinctive sounds that originate outside of the grinding chamber with a detectable acoustical characteristic located outside of the grinding chamber that is actuated only when the grinding operation is being performed, and including the step of
generating with said distinctive sounds generating member at least two distinctly different sounds depending upon whether there is, or is not, bulk food ingredient within the chamber being ground during the grinding operation.

16. The food grinding method of claim 15 in which
the detector is an acoustical detector, and
the step of detecting includes the step of detecting sound characteristics of sound associated with the distinctive sound generating means at a location outside of the grinding chamber and adjacent the distinctive sounds generating means.

17. A method of grinding food in a food grinder, comprising:
grinding a food ingredient with a grinding assembly having an electrically powered grinding mechanism for grinding food ingredient received within a grinding chamber, said grinding mechanism creating a detectable condition with a characteristic that changes between
- a first mode when the grinding mechanism is performing a grinding operation while there is bulk food ingredient within the grinding chamber that is being ground, and
- a second mode when the grinding mechanism is performing a grinding operation while there is no bulk food ingredient within the grinding chamber;

sensing with a detector when the characteristic changes between the first mode and the second mode;
selectively applying electrical power to the grinding mechanism;
responding to the detector for controlling the electrical power applying means including the step of responding with an electrical timer to the detector sensing the characteristic changing from the first mode to the second mode to measure a preselected time period; and removing electrical power from the grinding mechanism at the end of said preselected time period, said preselected time period being sufficient to remove fines from the grinding chamber after the chamber has been substantially emptied;

and in which the grinder includes a distinctive sounds generating means with a detectable acoustical characteristic located outside of the grinding chamber that is actuated only when the grinding operation is being performed, and including the step of said distinctive sounds generating means generating at least two distinctly different sounds depending upon whether there is, or is not, bulk food ingredient within the chamber being ground during the grinding operation, the distinctive sound generating means including a thin walled rotatable fin that rotates when the grinding mechanism is performing a grinding operation.

18. A method of grinding food in a food grinder, comprising:

grinding a food ingredient with a grinding assembly having an electrically powered grinding mechanism for grinding food ingredient received within a grinding chamber, said grinding mechanism creating a detectable condition with a characteristic that changes between a first mode when the grinding mechanism is performing a grinding operation while there is bulk food ingredient within the grinding chamber that is being ground, and a second mode when the grinding mechanism is performing a grinding operation while there is no bulk food ingredient within the grinding chamber;

sensing with a detector when the characteristic changes between the first mode and the second mode;

selectively applying electrical power to the grinding mechanism;

responding to the detector for controlling the electrical power applying means including the step of responding with an electrical timer to the detector sensing the characteristic changing from the first mode to the second mode to measure a preselected time period; and removing electrical power from the grinding mechanism at the end of said preselected time period, said preselected time period being sufficient to remove fines from the grinding chamber after the chamber has been substantially emptied.

and in which the grinder includes a distinctive sounds generating means with a detectable acoustical characteristic located outside of the grinding chamber that is actuated only when the grinding operation is being performed, and including the step of said distinctive sounds generating means generating at least two distinctly different sounds depending upon whether there is, or is not, bulk food ingredient within the chamber being ground during the grinding operation, and in which the grinding mechanism includes grinding burrs contained within the grinding chamber, an electrical motor located outside of the grinding chamber, a rotary motor axle interconnecting the electrical motor with the grinding burrs to rotate the grinding burrs during the grinding operation, and including the steps of generating at least one distinctive tone with a sound generating member linked to the rotary motor axle outside of the grinding chamber, rotating the distinctive sound generating member at a speed proportional to speed of the rotary axle to provide at least part of the acoustical characteristic to produce a relatively low frequency sound when in the first mode and the electrical motor is rotating relatively slowly, while the grinding operation is being performed and there is bulk ingredient within the grinding chamber that is being ground, and a relatively high frequency sound higher in frequency than the relatively low frequency sound when in the second mode and the electrical motor is rotating relatively faster, while the grinding operation is being performed while but there is no longer bulk food ingredient within the grinding chamber.

19. The food grinding method of claim 18 in which the distinctive sounds generating member includes a thin walled fin attached to the motor axle.

20. A method of grinding food in a food grinder, comprising:

grinding a food ingredient with a grinding assembly having an electrically powered grinding mechanism for grinding food ingredient received within a grinding chamber, said grinding mechanism creating a detectable condition with a characteristic that changes between a first mode when the grinding mechanism is performing a grinding operation while there is bulk food ingredient within the grinding chamber that is being ground, and a second mode when the grinding mechanism is performing a grinding operation while there is no bulk food ingredient within the grinding chamber;

sensing with a detector when the characteristic changes between the first mode and the second mode;

selectively applying electrical power to the grinding mechanism;

responding to the detector for controlling the electrical power applying means including the step of responding with an electrical timer to the detector sensing the characteristic changing from the first mode to the second mode to measure a preselected time period; and removing electrical power from the grinding mechanism at the end of said preselected time period, said preselected time period being sufficient to remove fines from the grinding chamber after the chamber has been substantially emptied;

and in which the grinder includes a distinctive sounds generating means with a detectable acoustical characteristic located outside of the grinding chamber that is actuated only when the grinding operation is being performed, and including the step of said distinctive sounds generating member generating at least two distinctly different sounds depending upon whether there is, or is not, bulk food ingredient within the chamber being ground during the grinding operation; and in which the grinding mechanism includes grinding burrs contained within the grinding chamber,
an electrical motor located outside of the grinding chamber,
a rotary motor axle interconnecting the electrical motor with the grinding burrs to rotate the grinding burrs during the grinding operation, and including the steps of
generating at least one distinctive tone with a sound generating member linked to the rotary motor axle outside of the grinding chamber,
rotating the sound generating member at a speed proportional to speed of the rotary axle to provide at least part of the acoustic characteristic to produce
  a relatively low frequency sound when in the first mode and the electrical motor is rotating relatively slowly, while the grinding operation is being performed and there is bulk ingredient within the grinding chamber that is being ground, and
  a relatively high frequency sound higher in frequency than the relatively low frequency sound when in the second mode and the electrical motor is rotating relatively faster, while the grinding operation is being performed while but there is no longer bulk food ingredient within the grinding chamber; and in which
the sound making member includes a thin walled fin attached to the motor axle. in which the mechanical vibrational characteristic is the frequency of vibration during operation of the grinding mechanism, said vibration frequency changing between a relatively low frequency when the mechanical vibrational characteristic is in the first mode and a relatively high frequency when the mechanical vibrational characteristic is in the second mode.

21. The food grinding method of claim 20 in which the step of terminating electrical power includes the step of
actuating a an electrical timer in response the mechanical vibrational characteristic changing from the first mode to the second mode to measure a preselected time period,
terminating electrical power to the grinding mechanism when the preselected time period has lapsed.

22. A food grinder, comprising:
a grinding assembly for grinding a food ingredient having a grinding including grinding burrs located within a grinding chamber driven by an electrical grind motor located outside of the grinding chamber;
a distinctive sound generating member rotatably linked to the electrical grind motor
said distinctive sound generating member creating a detectable sound originating outside of the grinding chamber with an acoustical characteristic that changes between
  a first mode when the grinding mechanism is performing a grinding operation while there is bulk food ingredient within the grinding chamber that is being ground, and
  a second mode when the grinding mechanism is performing a grinding operation while there is no bulk food ingredient within the grinding chamber;
a detector for sensing when the characteristic changes between the first mode and the second mode;
means responsive to the detector for removing electrical power from the electrical grind motor in response to the acoustical characteristic changing from the first mode to the second mode.

23. The food grinder of claim 22 including
an electrical timer responsive to the detector sensing the characteristic changing from the first mode to the second mode to start a preselected time period during which power continues to be applied to the grinding mechanism; and
means responsive to the timer for causing the electrical power terminating means to remove electrical power to the grinding mechanism only after the preselected time period has lapsed, said time period being sufficient to remove fines from the grinding chamber after the bulk food ingredient has been removed.

24. The food grinder of claim 22 in which distinctive sounds generating member includes a thin walled fin attached to a rotary axle of the electrical grind motor located outside of the grinding chamber.

25. A method of grinding food in a food grinder, comprising the steps of:
grinding a food ingredient with grinding burrs located within a grinding chamber driven by an electrical grind motor located outside of the grinding chamber;
generating distinctive sounds with a sounds generating member located outside of the grinding chamber and rotatably linked to the electrical grind motor, said distinctive sound generating member creating a detectable sound originating outside of the grinding chamber with an acoustical characteristic that changes between
  a first mode when the grinding mechanism is performing a grinding operation while there is bulk food ingredient within the grinding chamber that is being ground, and
  a second mode when the grinding mechanism is performing a grinding operation while there is no bulk food ingredient within the grinding chamber;
sensing with an acoustical detector when the characteristic changes between the first mode and the second mode; and
automatically removing electrical power from the electrical grind motor in response to the acoustical characteristic changing from the first mode to the second mode.

26. The food grinding method of claim 25 including
starting an electrical timer in response to the detector sensing the characteristic changing from the first mode to the second mode to start a preselected time period during which power continues to be applied to the grinding mechanism; and
causing the electrical power terminating means to remove electrical power to the grinding mechanism only after the preselected time period has lapsed, said time period being sufficient to remove fines from the grinding chamber after the bulk food ingredient has been removed.

27. The food grinding method of claim 25 in which the sounds generating member includes a thin walled fin attached to a rotatable axle of the grind drive motor at a location outside of the grinding chamber.

* * * * *